United States Patent Office 3,775,359
Patented Nov. 27, 1973

---

3,775,359
RIGID POLYVINYL CHLORIDE RESIN POWDER COMPOSITION FOR EXTRUSION PROCESSES
Joseph M. Georgiana, Mentor, James A. Rolls, Painesville, and Donald R. Voss, Cincinnati, Ohio, and Anthony M. Mierzwa, San Jose, Calif., and Robert A. Paradis, Painesville, Ohio, assignors to Diamond Shamrock Corporation, Cleveland, Ohio
No Drawing. Continuation-in-part of application Ser. No. 658,337, Aug. 4, 1967, now Patent No. 3,567,669. This application June 12, 1970, Ser. No. 45,890
Int. Cl. C08f 29/18, 29/24, 45/58
U.S. Cl. 260—23.7 R                    1 Claim

ABSTRACT OF THE DISCLOSURE

A densified rigid polyvinyl chloride resin powder composition is described which is particularly adapted to the preparation of many different types of plastic articles by extrusion, although incorporating no resinous processing aids as required heretofore in rigid polyvinyl chloride resin powder compositions for the successful extrusion thereof. Having a bulk density ranging from 0.55 g./cc. to about 0.80 g./cc. depending upon the bulk density of the base resin incorporated, the composition contains, by weight of the resin, from 0.25% to 7% of a heat and light stabilizer therefor; from 0.5% to 20% of a filler-pigment; and from about 0.10% to 5% of a nonresinous lubricant.

CROSS REFERENCE TO RELATED APPLICATIONS

This application is a continuation-in-part of our copending application, Ser. No. 658,337, filed Aug. 4, 1967, now U.S. Pat. 3,567,669.

BACKGROUND OF THE INVENTION

The present invention relates to an improved rigid resin powder composition prepared from polyvinyl chloride resin produced by an aqueous suspension process. This composition is designated herein as a "densified" composition since it has a much higher bulk density than similar polyvinyl chloride resin powder formulations prepared by conventional prior art dryblending methods. In particular, this invention relates to a densified rigid polyvinyl chloride powder, composition which can be successfully processed on even simple, nonvented extrusion equipment although containing no resinous processing aids as required in rigid powder compositions heretofore to impart satisfactory melt flow properties thereto.

Polyvinyl resin powder compositions incorporating suspension-polymerized polymer have enjoyed ever-increasing commercial use in recent years. These compositions, also known as "dryblends" or "powder blends" are typically prepared by physically blending one or more polyvinyl resins together with various other ingredients such as, e.g., stabilizers, plasticizers, impact modifiers, processing aids, pigments, etc., to provide the desired physical and chemical properties to finished articles fabricated from the resin. In the dryblending operation, the various ingredients are mixed only until they are homogeneously blended together to form powders or finely granular materials of homogeneous composition. The mixing time, the shear rates applied and the maximum mixing temperature attained by the blended material are insufficient to masticate or fuse the ingredients together into a solid resinous mass. Resin dryblends are significantly different in appearance and in processing characteristics from those polyvinyl resin formulations which are converted at high shear rates to fused, solid resinous masses which, in turn, are then ground, diced or otherwise converted into workable form prior to processing.

As initially known and used in the art, polyvinyl resin dryblends were prepared, for the most part, in blade-type mixers at low shear rates with some provision being made to supply heat to the blending components by external means. Subsequently, high shear mixers were developed wherein these compositions could be prepared more efficiently. Such mixers are equipped with high-speed agitation means whereby the heat necessary for intimate dispersion of the various additives throughout the resin, formerly supplied by external means, is typically developed within the mixer from friction between impinging resin particles or from contact of the particles with metal components in the mixer. Whether using the low-shear or the high-shear mixing apparatus, however, the maximum temperature attained by the blend material in the dryblending process varies generally from about 180° F. to about 260° F., depending upon the particular formulation being prepared.

Still more recently, an improved polyvinyl resin powder composition of the rigid type has been developed and is in use in the industry. As presently practiced and reported, preparation of this composition is effected in the high-shear mixing apparatus as described hereinabove, the blended material attaining a maximum temperature ranging from about 290° F. to about 340° F. This composition has a higher bulk density than the earlier dryblends and may be processed more quickly and efficiently. Even though containing a resinous processing aid, it cannot always be employed with satisfactory results, however, in all types of equipment, particularly equipment not specifically designed for powder processing. Further, a phenomenon known as "dusting" is observed in presently known densified powder compositions. "Dusting" is believed to be caused primarily by the nonhomogeneous dispersion of finely-divided compounding additives during the blending operation, which additives then separate out from the composition as "dust." The incomplete homogeneity of the composition as evidenced by "dusting" likewise contributes to the production of finished articles having unacceptable appearance and/or properties.

In our copending application, Ser. No. 658,337, now U.S. Pat. 3,567,699, there is described a further improvement in the preparation of rigid vinyl resin powder compositions via the high-shear mixing technique. This improvement comprises blending the ingredients of the composition in the high-shear mixing apparatus until the blended material attains a maximum temperature ranging between about 340° F., preferably 360° F. to about 425° F. By reason of such elevated mixing temperatures, the powder compositions prepared having a higher bulk density than similar formulations of the prior art and may be processed at optimum rates in many different types of equipment. Significantly, these materials are completely homogeneous in character and generally do not exhibit the "dusting" phenomenon observed in the prior art blends.

Similar to the practice in the prior art, the compositions prepared with our improved mixing technique likewise are intimate, physical blends of one or more suspension-polymerized polyvinyl chloride resins together with various other essential or optional ingredients. The essential ingredients typically are heat and light stabilizers for the resin and lubricants therefor, normally of nonresinous character. Other materials such as resinous impact modifiers, resinous processing aids, filler-pigments and even minor quantities of resin-plastifying organic liquids are optionally employed depending upon the end-use application of the composition. Such ingredients normally have been incorporated heretofore in polyvinyl resin rigid powder formulations to assure satisfactory processing performance of the resin and the preparation of high-quality finished plastic articles therefrom. Particularly, when formulating rigid powders for extrusion application in prior art practice, it has been found absolutely essential to incorporate an effective amount, i.e., at least 2 percent by weight of the resin component, of at least one resinous material as a processing aid for the resin in order to attain therefor the improved hot melt flow characteristics needed for successful processing.

It is quite surprising and unexpected, therefore, that by use of our improved high-shear mixing technique disclosed and claimed in copending application Ser. No. 658,337, now U.S. Pat. 3,567,669. We have been able to prepare a rigid polyvinyl chloride resin powder composition which contains no resinous processing aids such as were heretofore essential for successful rigid powder processing, yet this composition can be successfully processed at commercially acceptable rates even on equipment not specifically designed for powder processing including simple, nonvented extruders.

More particularly, U.S. Pat. 3,567,669 relates to a method for preparing a particulate, substantially non-agglomerated resin powder composition having a bulk density ranging between about 0.55 g./cc. and about 0.80 g./cc. comprising the steps of introducing into a high-shear mixing apparatus particulate polyvinyl chloride resin and from about 0.25% to 7%, by weight of the resin, of a heat stabilizer therefor which is at least one compound selected from the group consisting of metallic soaps, alkyl tin salts, organic esters of phosphorous acid, organic tin compounds which contain at least one Sn-S linkage, inorganic lead salts and salts containing complexed barium, cadmium, calcium or zinc metals; starting the high-speed agitator and intimately blending the resin and stabilizer ingredients until the temperature of the resultant mixture is raised by frictional heat to at least 170° F.; then adding to the mixture with continued mixing, from 0% to 20%, by weight of the resin, of a filler-pigment and from 0% to 20%, by weight of the resin, of a resinous impact modifier therefor, said resinous impact modifier being selected from the group consisting of terpolymers containing a major percentage of butadiene in combination with styrene and either acrylonitrile or methyl methacrylate, copolymers of ethylene and vinyl esters of lower fatty acids, copolymers of ethylene and alkyl acrylates or alkyl methacrylates, and chlorinated polyethylenes; adding from 0.1% to 8%, by weight of the resin, of a non-resinous lubricant which is at least one compound selected from the group consisting of fatty acids of 12–18 C atoms, the metallic salt, ester wax and partially saponified ester wax derivatives of fatty acids of 12–18 C atoms, organic liquids containing epoxy groups, naturally occurring and synthetic hydrocarbon waxes, mineral oil and glycerine when the blending mixture attains a temperature of at least 300° F.; thereafter continuing mixing of the composition until it attains a temperature of 360°–425° F.; transferring said composition from the mixing apparatus to a cooling vessel; and finally cooling the composition with agitation to a temperature no higher than 225° F. prior to use.

SUMMARY OF THE INVENTION

Accordingly, the present invention encompasses a rigid polyvinyl chloride resin composition which is a free-flowing substantially nonagglomerated powder adapted particularly for the production of high-quality plastic articles by extrusion processes. It is a physically blended, intimate mixture consisting essentially of a particulate, suspension-polymerized polyvinyl chloride resin; from about 0.25% to 7% of a heat and light stabilizer therefor; from about 0.5% to 20% of a filler-pigment, and from about 0.1% to 5% of a nonresinous lubricant, the percentage of ingredients other than the resin component being based on the weight of the resin.

As will be illustrated hereinafter by specific examples, this composition does not contain any resinous compounds of the types normally incorporated in rigid polyvinyl resin powder compositions heretofore to provide the proper hot melt flow characteristics for satisfactory extrusion performance of the powder blend. To the contrary, inclusion of such resinous processing aids in this densified composition appears to deleteriously affect its processing characteristics as evidenced by the unsatisfactory appearance of extruded items produced therefrom.

DESCRIPTION OF THE PREFERRED EMBODIMENTS

As used and understood in regular context in the art, the terms "rigid polyvinyl resin powder composition" or "rigid polyvinyl chloride resin powder composition" generally refer to compositions wherein a resin, such as polyvinyl chloride, is in intimate physical admixture with minor quantities of selected modifying ingredients which may also include up to about 10%, by weight of the composition of an organic liquid plasticizer for the resin. As used herein, however, the aforesaid terms are intended to refer only to those compositions wherein a polyvinyl chloride resin which has been prepared by a suspension-type polymerization technique is in intimate physical admixture only with a minor quantity each of one or more heat and light stabilizers therefor, a filler-pigment and one or more lubricants for the resin. Accordingly, those compositions which contain an effective amount of a resinous processing aid are excluded from the scope of this invention. Likewise, compositions which contain an effective amount, i.e., about 1 part of a resinous impact modifier per 100 parts of resin, are excluded from the scope of this invention.

The polyvinyl chloride resins which are utilized herein in the composition are prepared by conventional aqueous suspension polymerization processes as presently practiced in the art. In general, these resins have a relative viscosity ranging from about 1.70 to 3.25 and have a bulk density ranging from about 0.33 g./cc. to about 0.62 g./cc. For the production of high-quality articles possessing maximum heat stability and resistance properties, however, it is preferred at present to employ resins having a relative viscosity within the range of about 1.70 to 3.00. The comparable K-value for these presently preferred resins ranges from about 52 to 84. As designated herein, the relative viscosity value is determined at 30° C., employing a 1% solution of the polymer in cyclohexanone.

Stabilizers which generally may be employed herein are selected from those classes of compounds well known to the art and normally used heretofore to provide long-term heat and/or light stability to polyvinyl resins. As specific types of such compounds suitably employed may be mentioned metallic soaps, e.g., the stearates, laurates, ricinoleates of calcium, barium, magnesium, lead, zinc, etc.; alkyl tin salts of both fatty and nonfatty organic acids; organic esters of phosphorous acid; organic tin compounds which contain at least one Sn-S linkage, e.g., organic tin mercaptides or thioglycollates; inorganic lead salts, such as lead phosphates, silicates, etc.; and either solid, semisolid or liquid materials containing mixtures of barium, cadmium, calcium and/or zinc salts. These compounds may be incorporated singly in the formulation or may be employed in combination. Depending upon the formulation being prepared, the incorporation of about 0.25 to 7 parts of stabilizer for each 100 parts of resin in the composition generally is sufficient to obtain satisfactory heat and light stability.

In general, any of the compounds typically used in rigid polyvinyl resin powder formulations heretofore as lubricants for the resin may be incorporated in the composition of this invention for providing slip and anti-sticking properties to the resinous material during processing. Suitable compounds thus incorporated as lubricants herein include monobasic fatty acids containing from about 12 to 18 carbons per molecule; metallic salts of such monobasic fatty acids, and their ester waxes and partially saponified ester waxes; organic liquids containing epoxy groups; and various naturally occurring and synthetic hydrocarbon derivatives such as, for example, waxes, mineral oils or glycerine. Such ingredients typically are regarded as of nonresinous nature. For purposes of convenience, accordingly, they are broadly designated herein as "nonresinous" ingredients. These lubricant materials are generally incorporated in a total amount ranging from about 0.1 part up to 5 parts for each 100 parts of resin used. In formulating, the lubricants may be employed singly or two or more lubricants may be combined as the lubricant system.

The other ingredients incorporated in the composition are fillers such as, e.g., calcium carbonates, whitings and the like; and pigments such as titanium dioxide, carbon black and the like. Such materials are both designated herein as filler-pigments. Usually used for their opacifying power and for their ability to control the surface gloss of the finished articles, these filler-pigments may be employed in amounts ranging from about 0.5 to 20 parts per 100 parts of resin. Also included within the scope of this invention is the optional use of colorants and/or toners in the composition, which materials are normally used in extremely small amounts, depending upon the intensity of the color desired in the finished article. The use of such minute quantities of these ingredients affects neither the properties nor performance of plastic articles fabricated from compositions containing them.

As described hereinabove, the rigid polyvinyl chloride resin powder composition of this invention contains no additive resinous compounds as processing aids. Such compounds have necessarily been incorporated heretofore in rigid vinyl powder compounds in order to improve the hot melt flow properties, i.e., the melt fracture of the composition, particularly when it is processed at extremely high shear rates or in processing equipment wherein powder compositions normally are processed only with difficulty, e.g., in extruders with low L/D barrel ratios or those equipped with low compression, single-stage screws. Specific materials which have long been used as processing aids include, among others, chlorinated polyethylenes of low molecular weight; acrylonitrile, butadiene and styrene terpolymers or methyl methacrylate, butadiene and styrene terpolymers, each having a high styrene content; acrylonitrile-styrene copolymers of high styrene content; and various copolymers of alkyl esters of acrylic and methacrylic acids. In prior art practice, a minimum quantity of 2 parts of these materials per 100 parts of resin has been employed in order to obtain the extrusion performance desired. In marked contrast, the composition of this invention which contains no such resinous processing aids, can be easily processed on even simple equipment, e.g., nonvented extruders, for producing high-quality plastic articles, e.g., pipe, rods, tubing, sheet and various other types of shaped profiles. It should be understood, however, that the composition herein, if desired, may contain less than the heretofore accepted minimum effective amount of any of the aforementioned resinous materials without departing from the scope of this invention. The incorporation of such ingredients in the stated minor quantity will not materially improve either the performance of the composition or the properties of the resulting fabricated articles.

As described hereinbefore, the densified rigid polyvinyl chloride resin powder compositions of this invention are prepared in a high-shear mixer equipped with high-speed agitation means wherein the charged ingredients are rapidly recirculated by centrifugal action or other similar force at high velocity. The particular mixing techniques which may be employed are described in detail in our aforesaid copending application, U.S. Ser. No. 658,337, now U.S. Pat. 3,567,669 which disclosure is incorporated herein by reference. In this regard, it is to be noted that blending of the densified rigid powder composition must be continued until it reaches a blend temperature of a least 340° F. in order to impart the improved extrusion performance as described and claimed herein. Even though exposed to mixing temperatures at which substantial resin agglomeration or fusion would be expected, surprisingly no such agglomeration is apparent in the composition, to correspond to its significantly increased bulk density by comparison to that of the base resin. Accordingly, the prepared composition is observed to have an average particle size range which is substantially the same as that of the base resin.

As prepared, the finished resin composition is a particulate, substantially nonagglomerated, free-flowing powder wherein the individual particles have a slightly sintered or glazed surface. The stabilizing and lubricating ingredients incorporated in the composition are homogeneously absorbed and/or adsorbed by the resin particles. This homogeneous integration of the ingredients is designated herein as "intimate dispersion."

The bulk density of the composition will range generally from about 0.55 g./cc. to about 0.80 g./cc., typically from about 0.60 g./cc. to about 0.79 g./cc.

In preparing the composition, the sequence for incorporating the modifying ingredients into the resin is not especially critical and generally may be accomplished in any convenient manner As mentioned previously, specific details for suitable mixing procedures are described in U.S. Ser. No. 658,337, now U.S. Pat. 3,567,669.

Although containing no resinous processing aids, the rigid resin powder composition of this invention can be processed at commercially acceptable rates even on extrusion equipment not heretofore adapted to powder processing without danger of surging and/or air occlusion which would deleteriously affect the appearance and properties of the finished articles. The various extruded objects fabricated from the composition, e.g., pipes, fittings, tubing, film, sheet, etc., are characterized by high surface gloss and smoothness, with no evidence of nonhomogeneity or improper fusion of the resinous material, e.g., lumpiness, pock marks, or graininess. Further, the composition generally may be processed with less swell than has been encountered when similarly processing previous rigid powder compositions. Sizing difficulties with respect to extruded shapes are minimized as well as undesirable variations in wall thicknesses thereof. Most important, since expensive resinous processing aids are not necessary in the composition, the use of this material provides a substantial saving to the vinyl processor.

In order that those skilled in the art may more completely understand the present invention and the preferred methods by which the same may be carried into effect, the following specific examples are offered. In these examples and elsewhere herein where proportions of ingredients are described in parts, such proportions are by weight.

Example 1

A rigid polyvinyl chloride resin powder composition was prepared in a two-stage, high-share mixer (Papenmeier Mixer, Model TSEG–500/KMSO–800 with a total capacity of 17.5/28.0 cubic feet). The polyvinyl chloride resin used, produced in an aqueous suspension-polymerization process, has a relative viscosity of 2.35, determined by measuring at 30° C., a one-percent solution of the polymer in cyclohexanone. For each 100 parts of resin in the formulation there was blended therewith, 2 parts of a liquid organic tin mercaptide stabilizer (Thermolite 31—Metal and Thermit), 1.5 parts of titanium dixoide as filler-pigment, and, as lubricant, 0.8 part of a higher melting paraffin wax (Aristowax-Lanair Co.) and 2 parts of calcium stearate.

In the blending operation, the resin and the stabilizer were charged to the mixer at ambient temperature and the mixing cycle was started. When the temperature of the mixture reached 215° F., the titanium dioxide was incorporated. At a blend temperature of 320° F., the paraffin wax was added; the calcium stearate was incorporated when the mixture reached a temperature of 340° F. The blending mixture was discharged into the cooling vessel when a blend temperature of 365° F. was reached (total blend time is 15 minutes). The mixture was cooled with agitation to about 125° F. The finished composition had a bulk density of 0.69 g./cc.

A similar formulation was prepared by the same mixing procedure but was discharged from the mixer when a blend temperature of 320° F. was attained (12 minutes blending time). In this procedure, the paraffin wax and calcium stearate components were incorporated at blend temperatures of 275° F. and 295° F., respectively. This blend was cooled with agitation to 125° F. also. The bulk density of this composition was 0.58 g./cc.

Screen analysis of the two blended formulations indicated that the composition mixed to the higher maximum temperature had approximately the same particle size distribution as that mixed to the lower maximum temperature. Thus no significant agglomeration of the formulation occurred during mixing. The screen analysis data are as follows, including that of the base polyvinyl chloride resin employed:

|  | Percent retained | | |
| --- | --- | --- | --- |
| U.S. screen size | Blend, 365° F. max. | Blend, 320° F. max. | Base resin |
| 40 mesh | 2 | [1]T | 0 |
| 60 mesh | 1 | 1 | [1]T |
| 80 mesh | 14 | 26 | 23 |
| 100 mesh | 45 | 46 | 55 |
| 140 mesh | 26 | 20 | 18 |
| 200 mesh | 9 | 6 | 4 |
| <200 mesh | 3 | [1]T | [1]T |

[1] T=Trace amount.

Each of the above compositions was employed to produce 1-inch Schedule 40 pipe. They were processed by gravity feed in a 2½-inch Prodex extruder (24:1 L/D ratio) using a two-stage screw having a compression ratio (1st stage) of 2.9/1 with a metering depth of 0.090″, and a pump ratio of 2/1. For each run, the heating zones of the extruder were maintained at 400° F., the oil temperature was at 270° F. and the die temperature was at 400° F. The following extrusion data were obtained:

| Composition | Maximum blend temperature, °F. | Screw speed r.p.m. | Stock temperature, °F. | Extrusion rate, lbs./hr. |
| --- | --- | --- | --- | --- |
| 1 | 365 | 55 | 420 | 121 |
| 2 | 320 | 55 | 430 | 114 |

The composition mixed to the higher maximum temperature (No. 1) extruded at a faster rate than the composition prepared to the lower drop temperature (No. 2). During the extrusion, no surging of composition No. 1 was observed and the pipe product had a smooth and glossy surface inside and out, with no irregularity. Some surging was observed with respect to composition No. 2 and the pipe produced therefrom was out of size having a partially irregular surface which was extremely dull.

Although the rigid resin powder composition of this invention as described in this example was formulated without a resinous processing aid in contrast to prior art practice, extruded products fabricated therefrom exhibited generally improved physical properties, particularly impact resistance and hardness by comparison to powder formulations which contained processing aid and were blended up to maximum temperatures of 250° to 260° F., in accordance with the prior art. For comparison, the following prior art formulation was prepared:

PRIOR ART FORMULATION

| | Parts |
| --- | --- |
| Polyvinyl chloride | 100 |
| Organic tin mercaptide | 2 |
| Carbon black | 0.075 |
| Titanium dioxide | 1 |
| Paraffin wax | 0.8 |
| Calcium stearate | 2 |
| K-120-N [1] | 5 |

[1] Acryl acrylate-methyl methacrylate copolymer (Rohm and Haas)—resinous processing aid.

This material was discharged from the high-shear mixer upon attaining a temperature of 250° F. and had a bulk density of approximately 0.51 g./cc.

Products produced from our novel composition mixed to a blend temperature of 365° F., as prepared in this example, possess improved chemical resistance over prior art products. Following are some comparative physical and chemical property values obtained from molded test specimens of this composition and from those of the prior art formulation described above:

| | ASTM test | Composition of this example | Prior art composition |
| --- | --- | --- | --- |
| Physical properties: | | | |
| Tensile strength, p.s.i | D638 | 8,230 | 7,500 |
| Tensile modulus, p.s.i | D638 | 485,000 | 420,000 |
| Flexural strength, p.s.i | D790 | 13,270 | 13,000 |
| Izod impact ft. lbs./in. notch | D256 | 1.6 | 0.70 |
| Hardness, Shore D | D1706 | 85/1 | 85/1 |
| Deflection temperature, °C., under 264 p.s.i. load | D648 | 73 | 72 |
| Chemical resistance: | | | |
| 93% sulfuric acid (14 days floating at 55° C.) | D543 | | |
| Change in weight: | | | |
| Increase, percent max | | 0.0 | [1]1.0 |
| Decrease, percent max | | [1]0.02 | 0.1 |
| Change in flexural strength: | | | |
| Increase, percent max | | 4.0 | 5.0 |
| Decrease, percent max | | 0.0 | 5.0 |

[1] No sweating of specimen.

The composition of this invention has exceptional chemical resistance when compared to typical dryblended formulations as exemplified by the foregoing described composition of the prior art. When these compositions were tested using very strong chemicals, the following values were obtained:

CHEMICAL IMMERSION DATA AFTER 28 DAYS AT 60° C.

| Reagent | Tensile (p.s.i.) | Tensile modulus (p.s.i.) | Percent change in weight |
| --- | --- | --- | --- |
| Composition of this example (No. 1) (nonimmersed control) | 8,230 | 485,000 | |
| Prior art composition (No. 2) (nonimmersed control) | 7,500 | 420,000 | |
| 98% conc. sulfuric acid: | | | |
| Composition No. 1 | 9,410 | 460,000 | −0.05 |
| Composition No. 2 | 8,500 | 383,000 | −0.09 |
| Acetic acid (glacial): | | | |
| Composition No. 1 | 5,780 | 380,000 | 6.53 |
| Composition No. 2 | 2,800 | 213,000 | 10.85 |
| Nitric acid (68% conc.): | | | |
| Composition No. 1 | 9,050 | 480,000 | 1.10 |
| Composition No. 2 | 7,300 | 376,000 | 2.43 |
| Methyl alcohol: | | | |
| Composition No. 1 | 7,930 | 470,000 | 1.18 |
| Composition No. 2 | 6,000 | 395,000 | 3.8 |

Following are drop impact values obtained for 1-inch Schedule 40 pipe fabricated from the rigid resin composition of this invention, in accordance with standard Underwriters Laboratory and ASTM test procedures:

| | Foot pounds | |
| --- | --- | --- |
| Test procedure | Minimum requirement | Impact value of this composition |
| U.L. 20 lb. Blunt Tup (weight) | 100 | 120 |
| ASTM D2444 12 lb. Tup C (ASTM DWV specification) | [1]60 | 64.5±3.9 |

[1] On 1¼ inch pipe and above.

As these data indicate, the composition of this invention is processed to prepare rigid pipe having impact drop values substantially above the minimum requirements set by both the U.L. and the ASTM for acceptable pipe. Additionally, 2-inch Schedule 40 pipe fabricated from the composition exhibits drop impact values of 86.4±4.08 foot pounds, when tested in accordance with the ASTM D2444 procedure.

One-inch Schedule 40 pipe fabricated from the prior art rigid resin composition set forth in this example, when tested in accordance with the U.L. procedure designated, exhibits an impact value of 40 foot pounds (composition No. 2).

Example 2

This example illustrates that, in general, the composition of this invention must be prepared at a temperature of at least 340 F. in order to exhibit satisfactory processing performance and for the preparation of high-quality, commercially acceptable extruded articles.

The resin formulation employed was similar to that outlined in Example 1. The temperature indicated in the table below is the highest temperature to which the particular dry-blend was heated during mixing.

The extruder employed was the 2½" Prodex extruder employed in Example 1, using gravity feed, the two-stage screw run at 55 r.p.m. and also vacuum sizing. The zones of the extruder were maintained from back to front at 350, 370, 370 and 390° F., the oil temperature at 270° F. and the die at 380° F. The results obtained were as follows:

| Dry-blend | Maximum mix temp., °F. | Bulk density, g./cc. | Rate, lbs./hr. | Appearance of pipe |
|---|---|---|---|---|
| 1 | 320 | 0.58 | 105-108 | Very lumpy with rings, dull irregular outside surface. |
| 2 | 335 | 0.61 | 110 | Do. |
| 3 | 350 | 0.66 | 118 | Good, smooth glossy inner and outer surface. |
| 4 | 365 | 0.69 | 118 | Do. |

In view of the poor pipe obtained above from dry-blends 1 and 2, the extrusion conditions were modified by increasing the operating speed of the screw to 60 r.p.m. and raising the temperature of all of the extruder zones and the die to 390-400° F. Dryblends 1 and 2 were then extruded at the modified conditions and a small rate increase was observed. However, the fabricated pipe products obtained in each instance were still of very poor quality with essentially the same imperfections as the pipe from the previous runs. It appears that these dryblends, because of their lower bulk density, require more processing than supplied by the extruder at the stated conditions.

Some of the foregoing dryblends were then processed into 1-inch Schedule 40 pipe on the Prodex with the crammer operating and employing a two-stage screw having a compression ratio (1st stage) of 3.4/1 with a metering depth of 0.140", and a pump ratio of 2/1, operated at a speed of 55 r.p.m. The extruder heating zones were all maintained at 370° F. with the die at 400° F. Using these conditions, the following results were obtained:

| Dryblend | Rate, lbs./hr. | Appearance of pipe |
|---|---|---|
| 3 [1] | | Inside surface lumpy, rough dull outside surface. |
| 4 | 147 | Very good pipe. |
| 5 [2] | 158 | Do. |

[1] This dryblend was extruded again with the temperature of extruder zones 3 and 4 increased to 400° F., whereby good, commercially acceptable pipe was produced at a rate of 146 lbs./hr.
[2] Maximum mix temperature=380° F. with bulk density of 0.74 g./cc.

Example 3

To determine whether or not a rigid polyvinyl chloride powder composition as employed in the prior art but without a resinous processing aid can be successfully processed even on vented extrusion equipment, dryblends were prepared in the high-shear mixer from the following recipe:

| | Parts |
|---|---|
| PVC | 100 |
| Organotin mercaptide | 2 |
| $TiO_2$ | 1.5 |
| High melting paraffin wax | 0.8 |
| Calcium stearate | 2.0 |

One formulation (No. 1) contained resin of 2.35 relative viscosity, while the other blend (No. 2) used resin of 2.08 relative viscosity. Each blend was discharged from the mixer upon attaining a temperature of 250° F.

Each blend was then fabricated into 1-inch Schedule 40 pipe by processing on a vented NRM extruder fitted with a two-stage screw having a compression ratio (1st stage) of 3:1 with a metering depth of 0.107 inch, and a pump ratio of 1.7/1. The screw was operated at 49 r.p.m. The extruder heating zones were maintained from back to front at 330-355° F. The screw oil temperature was 200° F., the die was at 390° F. and the stock temperature was 410-415° F. Under these conditions, the extrusion rate of blend No. 1 was around 45 lbs./hr.; that of blend No. 2 was 40 lbs./hr. In each instance, the surface of the pipe produced was irregular due to surging from the extruder and was also extremely rough and grainy in appearance and hand. Further, the product from blend No. 1 was very brittle. Altering the processing conditions, e.g., increasing and lowering the screw speed, the oil temperature, etc., did not improve the quality of the pipe.

These results indicate that even on vented extrusion equipment a rigid powder composition as known and used heretofore in the art cannot be processed into commercially acceptable product if it does not contain a resinous compound as processing aid for the resin.

Example 4

Tests were conducted to determine the effect, if any, of resinous processing aids on the composition of the present invention. Three rigid polyvinyl chloride powder compositions were prepared according to the improved mixing procedure described in our copending application, Ser. No. 658,337. The basic formulation employed was essentially the same as outlined in Example 1, except that 5 phr. of K-120-N was added to each formulation as resinous processing aid. K-120-N is an acryl acrylate-methyl methacrylate copolymer manufactured by Rohm and Haas.

For each blend, the resin and stabilizer ingredients were first charged to the high-shear mixer employed in Example 1, and the mixing cycle was started. The pigment ingredients were added when the temperature of the blending mixture was 210-230° F. The acryl acrylate-methyl methacrylate copolymer ingredient was added when the mixture reached 280-285° F. Depending upon the maximum mix temperature to be attained, the temperature at which the paraffin wax and calcium stearate were subsequently added was 330-335° F. and 340-355° F., respectively. When the desired minimum mix temperature was reached, each blend was discharged into a cooling vessel wherein it was cooled to 125° F. as in Example 1.

Each dryblend was processed to prepare 1-inch Schedule 40 pipe, employing the gravity-fed, 2½-inch Prodex Extruder described in Example 1 equipped with the same two-stage screw operated at the speeds indicated in the following table. For each run, the heating zones of the extruder were maintained at 400° F. and the die at 400°

F. The temperature of the extrudate from the die was 420–425° F. The following extrusion data were obtained:

| Composition | Maximum mix temperature | Bulk density, g./cc. | Screw speed, r.p.m. | Screw oil temp., °F. | Extrusion rate, lbs./hr. |
|---|---|---|---|---|---|
| 1 | 354 | 0.632 | 48 | 180 | 96.5 |
|   |     |       | 52 | 240 | 108 |
| 2 | 360 | 0.673 | 52 | 280 | 98 |
| 3 | 380 | 0.693 | 48 | 240 | 100 |

At the same processing conditions, the extrusion rate of a conventional dryblend of similar composition (prepared at a maximum blend temperature of 250° F. and having a bulk density of 0.51 g./cc.) was 67.5 lbs.h/r.

The above data indicate that, as expected, rigid powder compositions which are prepared with continued blending to temperatures above 340° F. become densified and exhibit significantly improved processing rates compared to the processing rate of a similar composition prepared at lower temperatures. However, in contrast with the acceptable quality pipe obtained from the prior art composition, the pipe products produced from these densified compositions (1–3 above) modified by resinous processing aid, were not of commercially acceptable quality, haviny irregular dull surfaces, characterized by roughness, pocking and/or graininess. Thus, it appears that in contrast to prior art practice, the incorporation of a resinous processing aid in the compositions of this invention serves to deleteriously affect their processing performance and the quality of the plastic articles fabricated therefrom. It can, therefore, be concluded that a resinous processing aid of the type essential in prior art rigid powder compositions, must necessarily be excluded from the densified compositions of this invention to obtain the desired high-quality products.

Example 5

To determine the processing performance of the composition of this invention in nonvented extrusion equipment under various operating conditions, a rigid polyvinyl chloride powder composition was prepared according to the general mixing procedure outlined in Example 1. The formulation employed was substantially the same as that employed in Example 1, and the maximum mix temperature was 365° F. The bulk density of the finished composition was 0.70 g./cc.

In successive experiments, this composition was processed into 1-inch Schedule 40 pipe, using a 2½-inch, nonvented NRM extruder (20:1 L/D Ratio), fitted with different extruder screws as listed in the table below. The operating conditions and the extrusion rates of the composition obtained in these runs were as follows:

|  | Type of screw | | | | | |
|---|---|---|---|---|---|---|
|  | High compression [1] | | 110 [2] | | 107 [3] | |
| Screw speed, r.p.m. | 55 | 60 | 55 | 60 | 55 | 60 |
| Temperature, °F.—Extruder zone: | | | | | | |
| 1 | 375 | 370 | 375 | 375 | 360 | 360 |
| 2 | 388 | 380 | 405 | 380 | 375 | 375 |
| 3 | 380 | 385 | 385 | 380 | 380 | 380 |
| 4 | 392 | 395 | 392 | 395 | 395 | 400 |
| Die temperature, °F. | 350 | 350 | 350 | 350 | 350 | 350 |
| Oil temperature, °F. | 250 | 250 | 250 | 250 | 250 | 250 |
| Stock temperature, °F. | 420 | 440 | 455 | 450 | 440 | 445 |
| Rate, lbs./hr. | 146 | 158 | 119 | 133 | 72 | 80 |

[1] High compression screw—single-stage; compression ratio=3.8/1 with metering depth of 0.130″.
[2] 110 screw—single-stage; compression ratio=2.37/1 with metering depth of 0.175″.
[3] 107 screw—two-stage; compression ratio (1st stage) of 3/1, metering depth of 0.107″; pump ratio=1.7/1.

The pipe product from each of the above runs was of excellent quality with inner and outer surfaces smooth and glossy with no evidence of thermal breakdown.

The composition was subsequently processed into 2-inch Schedule 40 pipe through a 3½-inch Davis-Standard extruder (24:1 L/D Ratio), with the vent plugged, employing a two-stage screw with a 3.5/1 compression ratio (1st stage) with a metering depth of 0.140″ and no additional metering stage. The screw speed was 40 r.p.m. The temperature of the extruder heating zones from back to front was 380, 390, 390, 385, and 405° F., the oil temperature was 240° F. and the die was maintained at 410° F. Likewise, the stock temperature was 410° F. Under these conditions, the composition was processed at a rate of 166 lbs./hr. and the pipe product obtained was of excellent quality.

These results clearly show that the composition of this invention can be processed successfully in nonvented extrusion equipment to produce high-quality, commercially acceptable plastic articles.

Example 6

A rigid polyvinyl chloride resin composition was prepared employing Vygen 120, a polyvinyl chloride resin manufactured by General Tire Chemical Company, having a relative viscosity of 2.70, determined as set forth herein. For each 100 parts of resin, there was employed 1.8 parts of liquid organic tin mercaptide stabilizer, 1 part of titanium dioxide, and, as lubricants, 0.8 part of high melting paraffin wax, 1.5 parts of calcium stearate and 0.5 part of magnesium stearate.

The resin and stabilizer were charged to the mixer which was at a temperature of 120° F., and the mixing cycle was started. When the mixture reached a temperature of 220° F., the titanium dioxide was added. At a blend temperature of 325° F., the paraffin wax was added; the calcium and magnesium stearates were incorporated at a blend temperature of 340° F. The mixture was discharged into the cooling vessel when a blend reached a temperature of 365° F. The finished composition had a bulk density of 0.635 g./cc.

The composition was employed to prepare 1-inch Schedule 40 pipe, being processed by gravity feed in the 2½-inch vented Prodex extruder as employed in Example 1 with the two-stage screw. The heating zones of the extruder were maintained at temperatures of 380° F. to 420° F., incrementally increased from the back to the front of the extruder. The oil temperature was 300° F. and the die temperature was 410° F. The stock temperature was 440° F. under these conditions, the composition processed at a rate of 138 pounds per hour. The pipe product prepared showed no evidence of any thermal decomposition, having interior and exterior surfaces which were smooth and glossy.

Another composition was prepared similarly, incorporating a resin which has a relative viscosity of about 3.00 and a bulk density of 0.62 g./cc. The bulk density of the finished composition was 0.77 g./cc. This composition was extruded under conditions substantially as set forth above, except that the extruder heating zones were all maintained at 390° F., and the oil temperature was at 265° F. The stock temperature was 420° F. The pipe was produced at a rate of 128 pounds per hour with no sizing difficulties. The finished pipe had a smooth, glossy surface and showed no evidence of thermal breakdown.

It is to be understood that although the invention has been described with specific reference to particular embodiments thereof, it is not to be so limited, since changes and alterations therein may be made which are within the full intended scope of this invention as defined by the appended claim.

What is claimed is:

1. The product produced by the method of preparing a particulate, substantially non-agglomerated resin powder composition having a bulk density ranging between about 0.55 g./cc. and about 0.80 g./cc. comprising the steps of introducing into a high-shear mixing apparatus particulate polyvinyl chloride resin and from about 0.25% to 7%, by weight of the resin, of a heat stabilizer therefor which is at least one compound selected from the group consisting of metallic soaps, alkyl tin salts, organic esters of phosphorous acid, organic tin compounds which contain at least one Sn-S linkage, inorganic lead salts and salts containing complexed barium, cadmium, calcium or zinc metals; starting the high-speed agitator and intimately blending the resin and stabilizer ingredients until the temperature of the resultant mixture is raised by frictional heat to at least 170° F., then adding to the mixture with continued mixing, from 0% to 20%, by weight of the resin, of a filler-pigment and from 0% to 20%, by weight of the resin, of a resinous impact modifier therefor, said resinous impact modifier being selected from the group consisting of terpolymers containing a major percentage of butadiene in combination with styrene and either acrylonitrile or methyl methacrylate, copolymers of ethylene and vinyl esters of lower fatty acids, copolymers of ethylene and alkyl acrylates or alkyl methacrylates, and chlorinated polyethylenes; adding from 0.1% to 8%, by weight of the resin, of a non-resinous lubricant which is at least one compound selected from the group consisting of fatty acids of 12-18 C atoms, the metallic salt, ester wax and partially saponified ester wax derivatives of fatty acids of 12-18 C atoms, organic liquids containing epoxy groups, naturally occurring and synthesis hydrocarbon waxes, mineral oil and glycerine when the blending mixture attains a temperature of at least 300° F.; thereafter continuing mixing of the composition until it attains a temperature of 360°-425° F.; transferring said composition from the mixing apparatus to a cooling vessel; and finally cooling the composition with agitation to a temperature no higher than 225° F. prior to use.

References Cited
UNITED STATES PATENTS 3,090,763   5/1963   Hillier _____ 260—23

OTHER REFERENCES

"Vinyl Resins" by Mayo, pp. 233-236 (1958).

Poly (Vinyl Chloride) by Koleske et al., pp. 99 (1969).

"Toughening Thermoplastic Resins with Rubbers," by Davenport et al., British Plastics, December 1959.

"Developments in Processing Rigid PVC Powder," by Domininghaus British Plastics, vol. 39, pp. 397–400, July 1966.

DONALD E. CZAJA, Primary Examiner

E. C. RZUCIDLO, Assistant Examiner

U.S. Cl. X.R.

260—23 XA, 41 C, 891, 899